United States Patent [19]
Emo et al.

[11] Patent Number: 5,255,068
[45] Date of Patent: Oct. 19, 1993

[54] FRINGE PATTERN ANALYSIS OF A BIREFRINGENT MODIFIED SPECTRUM TO DETERMINE ENVIRONMENTAL TEMPERATURE

[75] Inventors: Stephen M. Emo, Elkhart, Ind.; Devlin M. Gualtieri, Ledgewood; Janpu Hou, Bridgewater, both of N.J.; Terrance R. Kinney, South Bend, Ind.; Robert C. Morris, Ledgewood; Herman van de Vaart, Califon, both of N.J.

[73] Assignee: Allied-Signal Inc., Morristown, N.J.

[21] Appl. No.: 796,743

[22] Filed: Nov. 25, 1991

[51] Int. Cl.$^5$ ............................................... G01B 9/02
[52] U.S. Cl. .................................... 356/351; 356/345; 356/44; 374/131
[58] Field of Search ................ 356/345, 351, 43, 44; 385/130; 374/131, 132, 161

[56] References Cited

U.S. PATENT DOCUMENTS

| | | | |
|---|---|---|---|
| 4,598,996 | 7/1986 | Taniuchi | 356/43 |
| 4,867,565 | 9/1989 | Lequime | 356/351 |
| 4,928,005 | 5/1990 | Lefevre et al. | 356/345 |
| 5,113,472 | 5/1992 | Gualtieri et al. | 385/130 |

*Primary Examiner*—Samuel A. Turner
*Attorney, Agent, or Firm*—Leo H. McCormick, Jr.; Larry J. Palguta; Robert A. Walsh

[57] ABSTRACT

A sensor for use in an optical temperature detector system having a birefringent element made of a single crystal metal oxide plate. A broad band light spectrum is transmitted through a first linear polarizing element to create a linearly polarized wave. The linearly polarized wave on passing through the single crystal metal oxide plate decomposes into first and second orthogonally polarized waves. Propagation of the linearly polarized wave through the birefringent single crystal metal oxide plate introduces a temperature dependent phase shift between the two waves. Thereafter, a second linear polarizer combines the first and second orthogonally polarized waves to create a modulated light spectrum having a fringe pattern, the fringe pattern being a function of the current temperature experienced by said birefringent element. A fiber optic cable connected to the second linear polarizing element carries the modulated light spectrum to an opto-electronic interface where the fringe pattern is extracted and a computer compatible signal is generated for a CPU to accurately indicate current environmental temperature conditions up to 1000° C. experienced by the single crystal plate crystal in the birefringent element.

14 Claims, 4 Drawing Sheets

FRINGE PATTERN ANALYSIS OF A BIREFRINGENT MODIFIED SPECTRUM TO DETERMINE ENVIRONMENTAL TEMPERATURE

This invention relates to an optical temperature sensor having a birefringent element made of a single crystal metal oxide plate. A broad band light spectrum is transmitted through a first linear polarizing element to create a linearly polarized wave. The linearly polarized wave on passing through the single crystal metal oxide plate decomposes into first and second orthogonally polarized waves. Propagation of the linearly polarized wave through the birefringent single crystal metal oxide plate introduces a temperature dependent phase shift between the two waves. Thereafter, a second linear polarizer combines the first and second orthogonally polarized waves to create a modulated light spectrum. Information derived from this modulated light spectrum or fringe pattern is then used to measure the temperature of the birefringent single crystal metal oxide plate.

It is common practice to electrically transmit operational parameters from point to point through bundles of copper wires. Although these bundles may be shielded, electromagnetic interference and electromagnetic pulse can effect the electrical signals carried on these copper wires. In an effort to eliminate this interference and at the same time reduce the weight of the transmission lines, it has become desirable to transmit the operational parameters in the form of optical signals through optical fibers.

U.S. Pat. No. 4,598,996 discloses a detector system which uses optical fibers for communicating changes in the refraction index of birefringent crystals such as $LiTaO_3$ or $Sr_xBa_{1-x}Nb_2O_6$ to measure temperature in an environment. The sensor in this detector utilizes a relatively narrow spectral band excitation source and relies on the detection of the change in transmitted intensity which varies sinusoidally with temperature. Hence, the practical measurement range is limited to less than one half of the period of the oscillatory output, and the accuracy of measurement is limited by uncertainties imposed by the intensity detection scheme. Moreover, the sensor materials, $LiTaO_3$ and $Sr_xBa_{1-x}Nb_2O_6$, experience ferroelectric Curie transitions at 660° C. and 270° C. maximum, respectively, and therefore can not be used in an environment where the temperatures is higher than 660° C. U.S. Pat. No. 4,928,005 discloses a detector system having a multiple point sensor wherein the birefringent properties of a polarization maintaining glass fiber is used to measure temperature. As with the sensor disclosed in U.S. Pat. No. 4,598,996, the temperature range of this multiple point sensor even with suitable fiber coatings is limited to an operational temperature range of from −100° C. to +300° C.

Unfortunately, many applications require temperature detector systems having a sensor which is capable of operating at higher temperatures and over a wider range of temperatures than is feasible by the prior art sensors. For example, the control of an operational turbine engine whether used in industry at a stationary location or in an aircraft have many engine components wherein the temperature exceeds 660° C. and continual accurate knowledge of the operational parameters thereof is required to safely operate the turbine engine rendering prior art optical temperature sensors ineffective.

We have found that information obtained by analyzing a broad band light spectrum transmitted through a birefringent single crystal metal oxide plate made of lanthanum beryllate ($La_2Be_2O_5$) accurately measures the temperature in an environment up to 1000° C. with an accuracy of ±1° C. or better. We have combined this birefringent element with high temperature polarization maintaining optical,, waveguides, as disclosed in U.S. Pat. No. 5,113,472 and its Continuation-in-Part U.S. patent application 797,009, filed Nov. 25, 1991, to form a sensor for use in a temperature detection system to provide a current signal indicative of the environmental conditions such as would be experienced by the components of a turbine engine. The sensor has a first linear polarizing element for orienting an initial broad band light spectrum carried on a first optical cable from a source into a linearly polarized wave. This linearly polarized wave is then transmitted through a first high temperature polarization maintaining optical waveguide into the high temperature region or environment where the birefringent single crystal plate is located. By suitably orienting the birefringent single crystal plate with respect to the polarization of the initial broad band light spectrum or light, the linearly polarized wave is decomposed into first and second orthogonally polarized waves. The first and second orthogonally polarized waves are passed through a second high temperature polarizing waveguide to maintain the polarization of the first and second orthogonally polarized waves, and thereafter recombined to create a modulated light spectrum having a fringe pattern. A second optical cable connected to the second polarizing element carries the modulated light spectrum to an opto-electronic interface where the fringe pattern is extracted to provide a CPU with a signal indicative of an accurate measurement of the current environmental temperature conditions up to 1000° C. experienced by birefringent crystal.

It is an object of this invention to provide an optical temperature detector system for accurately measuring the temperature in an environment up to 1000° C. with an accuracy of a ±1° C. The detector system is made up of a first polarizing element, a first high temperature polarization maintaining optical waveguide to carry light into a high temperature zone or environment, a birefringent single crystal metal oxide plate consisting of a lanthanum beryllate crystal plate located in the temperature zone or environment, a second high temperature polarization maintaining optical waveguide to carry the modulated light which passes through the crystal plate out of the high temperature zone, a second polarizing element, interconnecting optical fiber and the opto-electronic interface through which a current operational temperature signal is derived from the modulated light indicative of the temperature in the environment.

It is a further object of this invention to provide a spectrometer with a sensor wherein a polarized broad light spectrum after passing through a birefringent element is analyzed by a polarizing element to create a modulated light spectrum having a fringe pattern, the fringe pattern being a function of the temperature of the birefringent element.

These objects and other advantages should be apparent from reading this specification viewing the drawings wherein:

FIG. 1 is a schematic illustration of a temperature detector system made according to the present invention whereby a linearly polarized broad band light spectrum is modulated on passing through a lanthanum beryllate single crystal plate and an analyzer to provide a fringe pattern corresponding to the current temperature of the environment in which the lanthanum beryllate single crystal plate is located;

Figure 4:
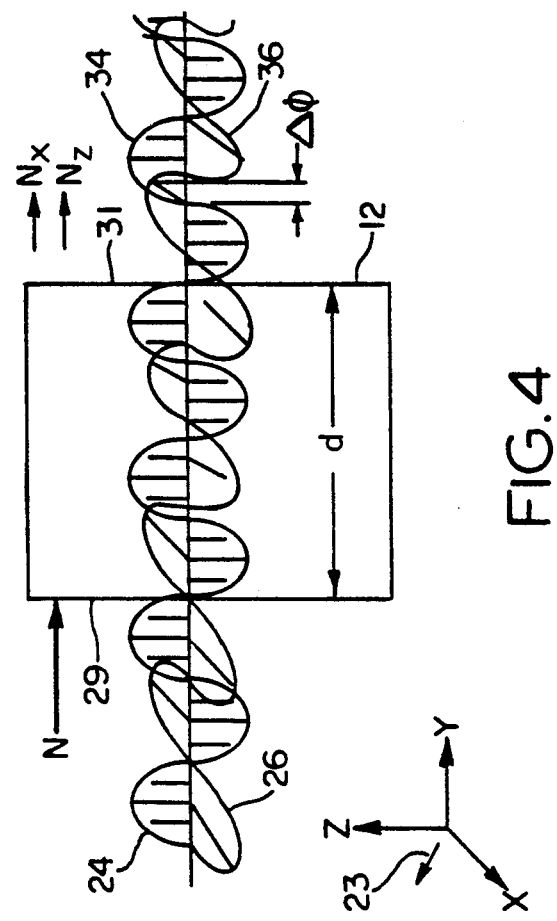
Figure 5:
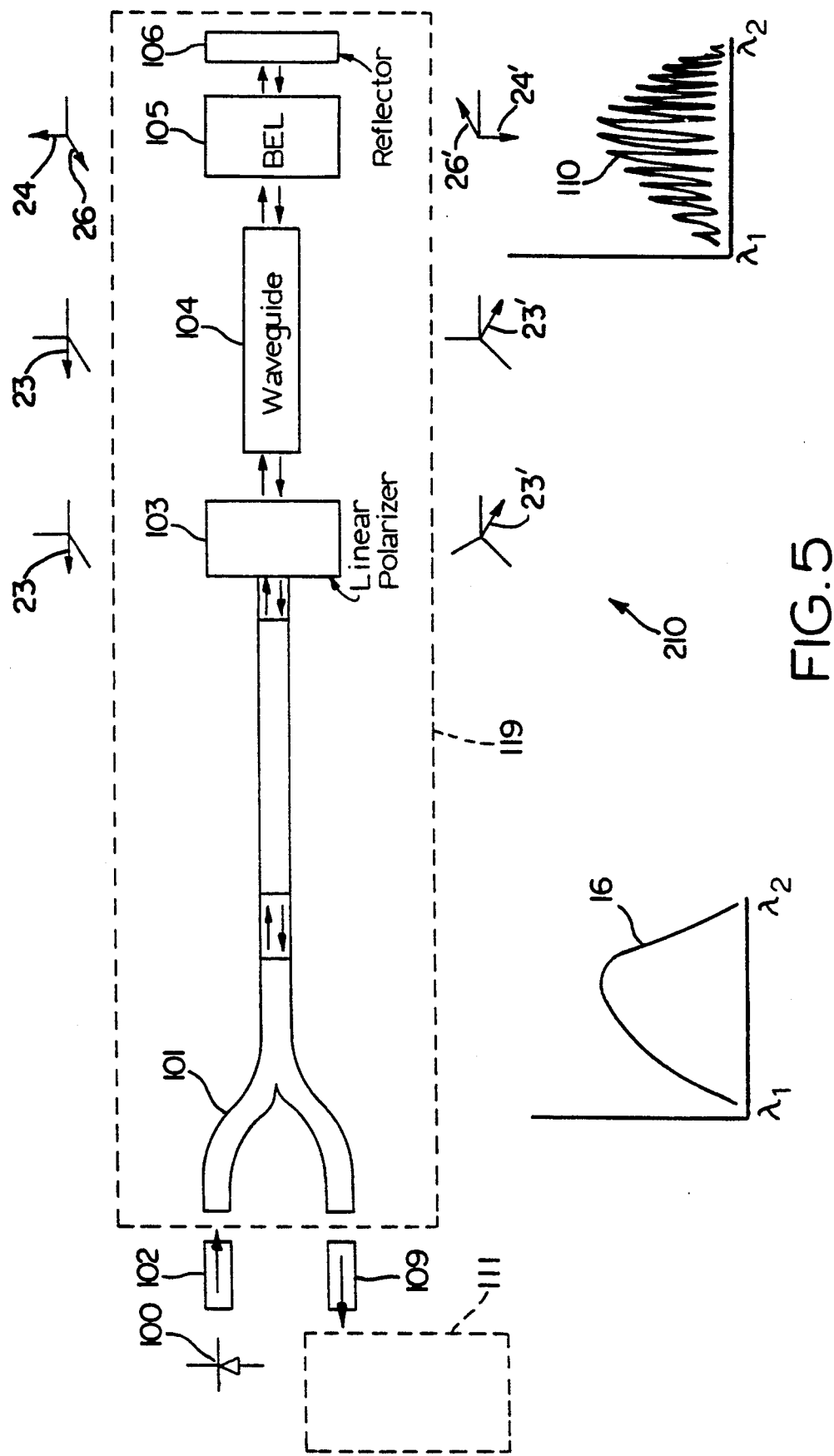

FIG. 4 is a schematic illustration of the light spectrum prior to entering, passing through and exiting the lanthanum beryllate crystal plate; and FIG. 5 is a schematic illustration of an alternate configuration of the temperature detector system made according to the present invention wherein a modulated linearly polarized broad band light spectrum after passing through a lanthanum beryllate single crystal plate is reflected back through the lanthanum beryllate single crystal plate and linear polarizer to a splitter before being presented to an optoelectronic interface where a fringe pattern is derived which corresponds to the current temperature of the environment in which the lanthanum beryllate crystal plate is located.

Figure 1:
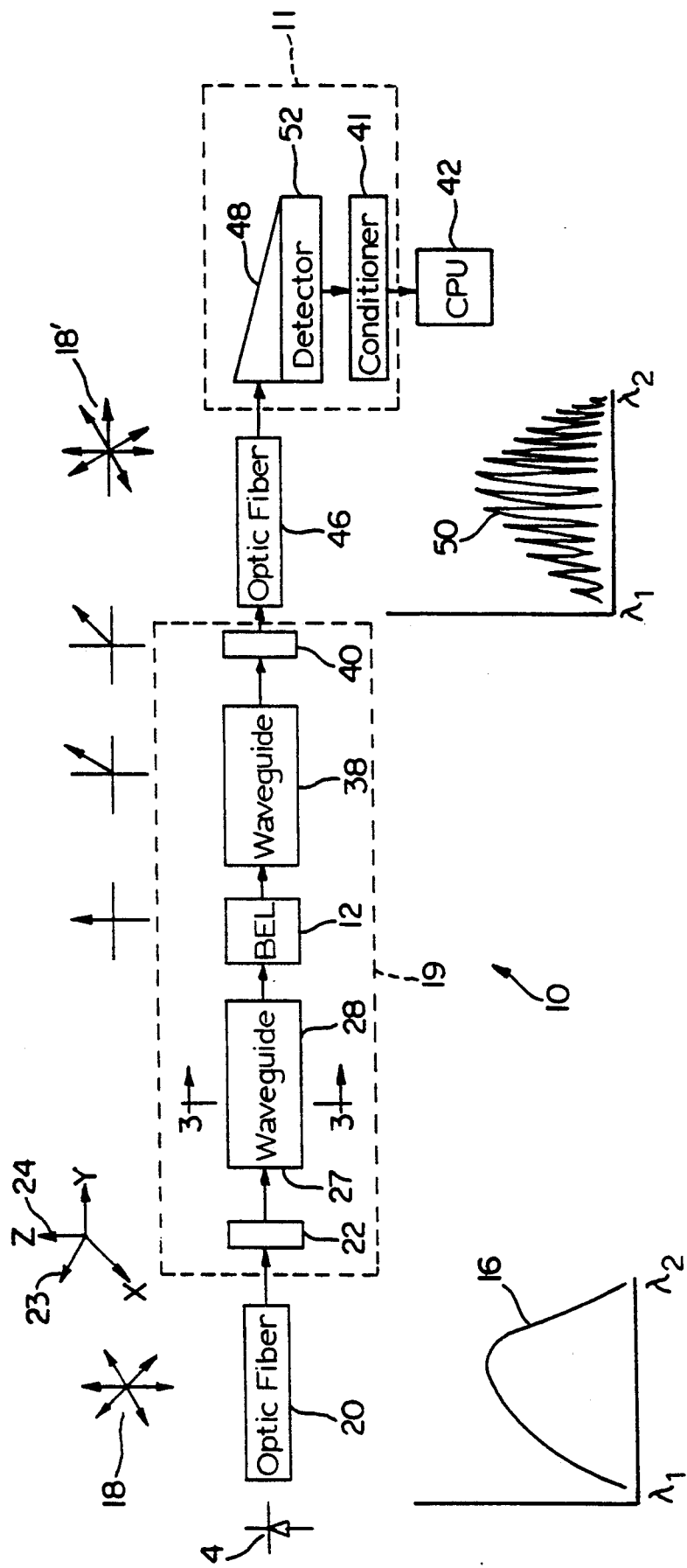
Figure 2:
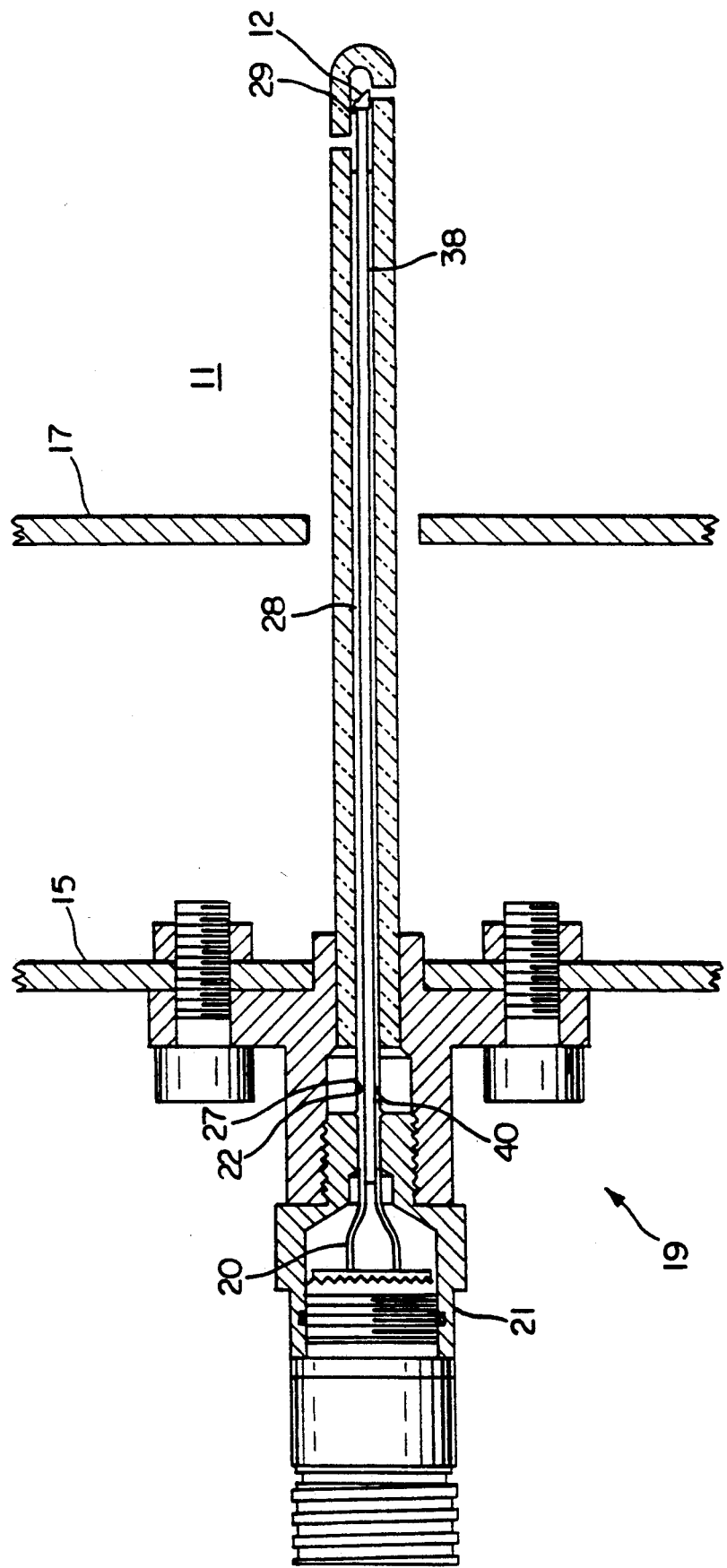
FIG. 2 is a schematic illustration of the optic sensor of FIG. 1.

The temperature detecting sensing system 10, shown in FIG. 1, includes a sensor 19, illustrated in FIG. 2, which is designed to be affixed at various locations to provide temperature information of areas within a turbine engine. An operational signal from the temperature sensing system 10 after passing through an optoelectronic interface 11 is presented to the central processing unit (CPU) 42 which controls the operation of the turbine engine. As shown in FIG. 2, a birefringent element or single crystal plate 12 of sensor 19 is located in an actual high temperature environment 11. Shrouds 17 and the casing 15 of the turbine engine protect the fiber optic cables 20 connecting a light source 14 to the sensor 19 from the operational temperature experienced by environment 11.

The temperature sensing system 10 utilizes a broad band light spectrum such a illustrated by curve 16 generated by the source 14 such as a light emitting diode. The broad band light spectrum is randomly polarized as depicted in 18 and is transmitted through the fiber optic cable 20 to the connector of sensor 19. The randomly polarized light presented to the connector 21 is directly communicated to a linear polarizer 22 in sensor 19. After passing through the linear polarizer 22, the light has a single plane of polarization 24 as illustrated in FIG. 1. In order to protect the linear polarizer 22 from the high temperature of the environment whose temperature is being measured, a polarization maintaining optical waveguide 28 as shown in FIG. 2 is utilized to propagate the polarized light to the birefringent sensor element or single crystal plate 12. The high temperature optical waveguide 28 and its polarization maintaining properties which is more fully described in U.S. patent application 706,492 and its Continuation-in-Part U.S. patent application 000000 are incorporated herein by reference.

Figure 3:
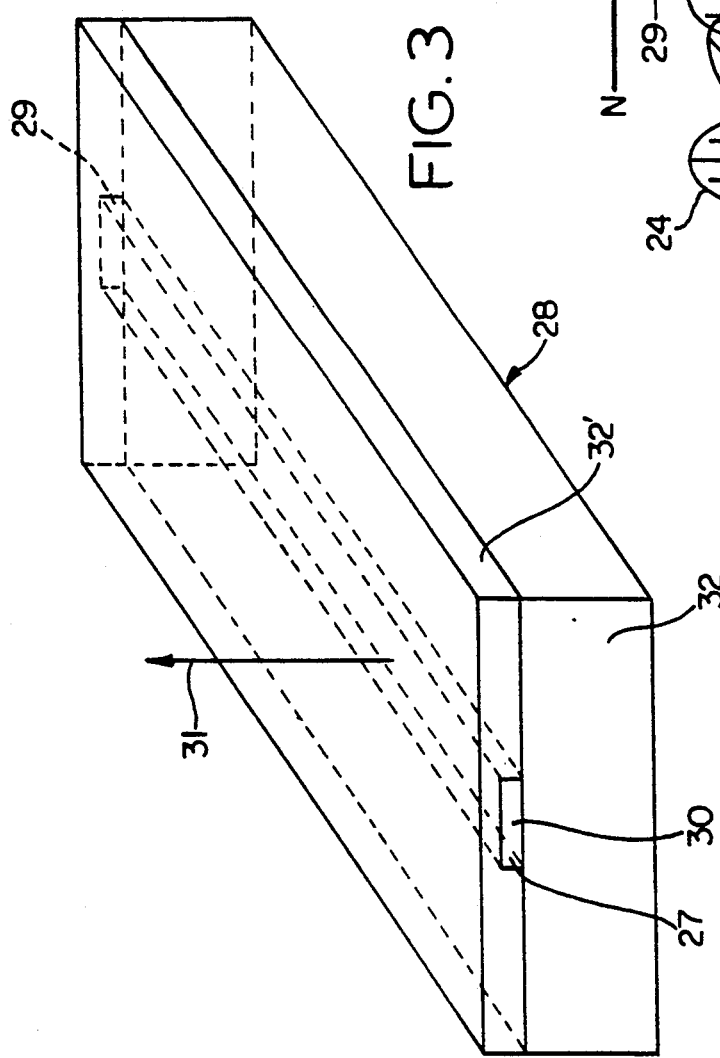
FIG. 3 is a schematic illustration of a polarization maintaining optical waveguide for directing the light into and out of the lanthanum beryllate single crystal plate of FIG. 1.

The high temperature optical waveguide 28 has a high refractive index core 30 made from a substituted aluminum garnet embedded in a lower refractive index cladding material 32 and 32', yttrium aluminum garnet, as shown in FIG. 3. While many materials may be suitable for the substituted aluminum garnet, core 30 of the optical waveguide 28, we have used terbium lutetium aluminum garnet (($Tb,Lu)_3Al_5O_{12}$) embedded in yttrium aluminum garnet ($Y_3Al_5O_{12}$). We have found that waveguide 28 exhibits a $\Delta n$ value of 0.027, where $\Delta n$ is the difference in the refractive index of terbium lutetium aluminum garnet, core (n=1.8545) and yttrium aluminum garnet, clad (n=1.8275). This $\Delta n$ value is comparable to that of typical optical fibers such as that in optical cable 20. Because a lattice mismatch is formed during manufacturing between the waveguide core 30 and the clad material 32 and 32', a stress is induced in the plane of the waveguide core 30. This stress induces birefringence, which in turn causes the core 30 to maintain the polarization of the incoming light when the light is polarized either parallel to the optic axis 31 (normal to the plane of the waveguide), or at right angles to the optic axis 31. For the present application, the waveguide 28 of sensor 19 has a length of 1-3 inches (2.5-7.5 cm) which is sufficient to position the linear polarizer 22 away from the environment 11 in the turbine engine. Thus, the temperature of environment 11 while acting on the single crystal plate or birefringent element 12 does not adversely affect the polarizer 22. The optic axis of the polarization maintaining waveguide core 30 is aligned either parallel or at 90° with the optic axis of the linear polarizer 22. The degree of polarization of the light presented to face 27 of waveguide 28 is essentially unchanged when presented to face 29, see FIG. 4, of the birefringent element or single crystal plate 12.

In the present application, the birefringent element 12 consists of a thin plate of single crystal lanthanum beryllate ($La_2Be_2O_5$), commonly referred to as BEL. BEL has a large temperature coefficient of birefringence, dB/dT.

Generally, crystals are anisotropic with respect to their physical properties, i.e. their property values vary with the direction in the crystal. Anisotropy of the refractive index is called birefringence. BEL is an optical biaxial crystal which has three distinct principal indices of refraction for the three orthogonal directions X, Y, and Z. FIG. 4 shows two orthogonally polarized waves 24 and 26 propagating through a birefringent element or single crystal plate 12. The electric polarization vectors of these two waves 24 and 26 are oriented in the X- and Z-directions, respectively, and the waves propagate in the Y-direction.

On entering face 29 of the birefringent crystal 12, the linearly polarized wave 23 decomposes into two orthogonally polarized waves 24 and 26. The two waves 24 and 26 are easily generated by orienting the linear Polarizer at a 45° angle with respect to the X and Z axis of the birefringent crystal 12. These two waves propagate through the birefringent element or single crystal plate 12 at different velocities due to difference in refractive indices $n_x$ and $n_z$. Hence, the two waves 24 and 26, which exhibit zero phase difference on entering the birefringent element or single crystal plate 12, exhibit a certain phase difference $\Delta 0$ on exiting face 31. The phase difference $\Delta 0$ depends on the difference in the indices of refraction $n_x$ and $n_z$, the path length "d" through the birefringent element or single crystal plate 12, temperature of the birefringent element or single crystal plate 12 and the wavelength of the broad band spectrum or light from source 14. After propagating through the birefringent element or single crystal plate 12, the two orthogonally polarized waves 34 and 36 can be combined to form a linearly polarized wave polarized along the original direction 23 for phase shifts of exactly $(n-1) \times 360°$, polarized at 90° to the original direction 23 for phase shifts of exactly $(2n-1)-1) \times 180°$, circularly polarized for phase shifts of exactly $(2n-1) \times 90°$, where n=1, 2, 3, ..., and elliptically polarized for all other phase shifts.

On exiting the birefringent element or single crystal plate 12, the two orthogonally polarized waves 34 and 36 are directed into a second polarization maintaining waveguide 38, identical in structure with waveguide 28, and carried to the second linear polarizer 40, commonly called the analyzer. As with the first linear polarizer 22 and the first polarization maintaining waveguide 28, the optic axis of the second linear polarizer 40 and the optic axis of the second polarization maintaining waveguide 38 are aligned either parallel or at 90° to each other. However, first linear polarizer 22, first polarization maintaining waveguide 28, second polarization maintaining waveguide 38 and second linear polarizer 40 are all oriented at 45° or an odd multiple thereof with the X and Z axis of the birefringent element or single crystal plate 12 to assure equal amplitudes in the two orthogonally polarized waves 34 and 36. Thus, when the two orthogonally polarized waves are combined by the second linear polarizer 40, a modulated light spectrum is produced having a fringe pattern such as shown by curve 50 in FIG. 1. This modulated light spectrum is carried on fiber optic cable 46 to the opto-electronic interface 11. A prism 48 in the opto-electronic interface 11 directs the modulated light spectrum to a lens grating assembly for focusing onto an array of photodetectors or a charge coupled detector device 52 associated with conditioning electronics 41 in the opto-electronic interface 11. The conditioning electronics 41 acts on a signal from the detector device 52 to produce an output signal which is communicated to a CPU 42 where the fringe pattern is extracted in a manner as taught in U.S. patent application 762,837 filed Sep. 19, 1991.

The number of fringes N in a given wavelength interval $\lambda_1$ to $\lambda_2$ and the change in the number of fringes as a function of temperature can be calculated using the following formulas:

$$N = d(1/\lambda_1 - 1/\lambda_2)B$$

$$dn/dt = d(1/\lambda_1 - 1/\lambda_2)dB/dT$$

where:
B = the birefringence of a crystal at a given temperature.
d = the thickness of the birefringent crystal plate.
$\lambda_1$ = lower wavelength limit of the spectrum.
$\lambda_2$ = upper wavelength limit of the spectrum.

Thus, by merely counting the number of fringes, the current temperature of the environment 11 in which the birefringent element or single crystal plate 12 is located can be determined.

From previous experiments it has been determined that the birefringence B for BEL is 0.07 and the change in birefringence with respect to temperature dB/dT over a temperature range from 0° C. to 1000° C. is $9.09 \times 10^{-6}/°$ C. Assuming $\lambda_1 = 780$ nm, $\lambda_2 = 880$ nm and d = 1 mm, one finds:

$$N = 10^{-3} \times (1/780 - 1/880) \times 10^{30\ 9} \times 0.07$$

$N = 10$ fringes $$dn/dT = 10^{-3} \times (1/780 - 1/880) \times 10^{+9} \times 9.09 \times 10^{-6}$$

$dN/dT = 0.013$ fringes/° C.

In actual tests of the temperature detector system 10 using the above parameters and the method of counting fringes as disclosed in U.S. patent application 762,837, accurate current environmental temperatures to within ±1° C. up to 1000° C. have been generated as operational information of a turbine engine for CPU 42.

The sensor 19 for use in a temperature detector system 10 described above with respect to FIG. 1 only operates in a transmission mode, i.e. light passes through each elements of the system 10 only once and only in one direction. Under certain operating conditions, it may be desirable and a more compact sensor 119 may be obtained if the modulated wave on passing through the single birefringent element or single crystal plate were reflected back through the temperature detector system 210 to a splitter 101 as illustrated in FIG. 5. A broad band light spectrum from the source 100 is directed through a fiber optic cable 102 to the fiber coupler or splitter 101. Splitter 101 only affects the modulated light which is reflected back into the system 210 from the birefringent element or single crystal plate 105 and not light from source 100. After passing through splitter 101, light from source 100 is transmitted through a single linear polarizer 103 and a polarization maintaining waveguide 104, of the type shown in FIG. 3, for presentation to birefringent crystal plate 105. As in the temperature detector system 10, the broad band light spectrum is transmitted on the optic axis of the linear polarizer 103 and the polarization maintaining waveguide 104 which are aligned either parallel or at 90° with each other, and the X and Z axis of the birefringent element or single crystal plate 105 is aligned at 45° or an odd multiple thereof with the optic axis of polarization maintaining waveguide 104 and linear polarizer 103. On entering the birefringent element or single crystal plate 105, the linear polarized wave decomposes into two orthogonally polarized waves which on propagating through the birefringent element or single crystal plate 105 experience a phase shift due to the difference in refractive indices $n_x$ and $n_z$, in the same manner illustrated in FIG. 4. After passing through the birefringent element or single crystal plate 105, both orthogonally polarized waves are reflected back into the birefringent element or single crystal plate 105 by reflector 106. It is anticipated that reflector 106 could be either highly reflecting metal mirror or a reflecting film deposited directly on the birefringent element or single crystal plate 105. On exiting the birefringent element or single crystal plate 105, the orthogonally polarized reflected waves are directed back through polarization maintaining waveguide 104 to linear polarizer 103 where the two orthogonally polarized waves are combined to produce a modulated light spectrum having an imposed fringe pattern as shown by curve 110. Given that birefringent element or single crystal plate 105 is ½ thickness of the birefringent element or single crystal plate 12 of FIG. 1 and both are at the same temperature, curves 110 and 50 would have the same fringe pattern over the wavelengths.

In temperature detector system 210 only a portion of the modulated light spectrum, generally 50%, carried to the fiber coupler or splitter 101 is communicated to an opto-electronic interface 111 by fiber cable 109 where the fringe pattern is extracted in the manner as with temperature detector system 10 of FIG. 1. Some of the advantages of the use of a reflection temperature detector system 210 over the transmission temperature detector system 10 are: only one polarizer 103 and polarization maintaining waveguide 104 are needed and the birefringent element or single crystal plate 105 only has to be half as thick since the light propagates twice through the plate.

We claim:

1. A sensor for use in a temperature detector system to provide a detector array with a signal indicative of the current environmental temperature conditions experienced by the sensor, said sensor comprising:
   a first linear polarizing element for orientating an initial broad band light spectrum communicated from a source carried on a first optic cable into a linearly polarized wave;
   a first high temperature optical waveguide consisting of a high refractive index core made of substituted aluminum garnet surrounded by a lower refractive index cladding made of yttrium aluminum garnet for directing said linearly polarized wave along a desired path while maintaining the polarization state of said linearly polarized wave;
   a birefringent crystal located adjacent said high refractive index core of said first high temperature optical waveguide for receiving said linearly polarized wave from said first linear polarizing element, said linearly polarized wave decomposing into first and second orthogonally polarized waves, said first and second orthogonally polarized waves experiencing a phase difference on propagating through said birefringent crystal;
   a second high temperature optical waveguide consisting of a high refractive index core made of substituted aluminum garnet surrounded by a lower refractive index cladding made of yttrium aluminum garnet for communicating said first and second phase delayed orthogonally polarized waves from said birefringent crystal; and
   a second linear polarizing element for combining said first and second orthogonally polarized waves to create a modulated light spectrum having a fringe pattern, said fringe pattern being a function of the current temperature experienced by said birefringent element; and
   a second fiber optic cable connected to said second linear polarizing element for carrying said modulated light spectrum to an opto-electronic interface where said fringe pattern is extracted to accurately measure current environmental temperature conditions up to 1000° C. experienced by said birefringent crystal.

2. The sensor for use in the temperature system as recited in claim 1 where said birefringent crystal is lanthanum beryllate having a birefringence B of 0.07 and a change in birefringence with respect to temperature dB/dT of $9.09 \times 10^{-6}$/°C.

3. The sensor for use in the temperature system as recited in claim 2 wherein said fringe pattern is dependent on the thickness of said birefringent crystal, the wavelengths of said initial light spectrum, and the temperature of said birefringent crystal.

4. The sensor for use in the temperature system as recited in claim 3 wherein the X and Z axis of said birefringent crystal are oriented at an odd integer multiple of 45° to the optic axis of said first and second linear polarizing element and the optic axis of the first and second high temperature polarization maintaining waveguide to maximize said fringe pattern.

5. A sensor system for providing a CPU with a compatible signal indicative of the current environmental temperature, said sensor system comprising:
   a first linear polarizing element for orienting an initial broad band light spectrum communicated from a source carried on a first optic cable into a linearly polarized wave;
   a single birefringent crystal located adjacent said first linear polarizing element for receiving said linearly polarized wave from said first linear polarizing element, said linearly polarized wave decomposing into first and second orthogonally polarized waves, said first and second orthogonally polarized waves experiencing a phase difference on propagating through said birefringent crystal;
   a second linear polarizing element for combining said first and second orthogonally polarized waves to create a modulated light spectrum having a fringe pattern, said fringe pattern being a function of the current temperature experienced by said birefringent element;
   a second fiber optic cable connected to said second linear polarizing element for carrying said modulated light spectrum; and
   an opto-electronic interface including a prism and lens grating assembly directly connected to said second fiber optic cable for focusing and diffracting said modulated light spectrum onto an array of photodetectors to produce a corresponding electrical signal, and conditioning electronics for analyzing said electrical signal to extract a single phase at a fixed frequency and the dominant peak frequency to develop said compatible signal to accurately indicate current environmental temperature up to 1000° C. experienced by said birefringent crystal.

6. The sensor for use in the temperature system as recited in claim 5 where said birefringent crystal is lanthanum beryllate having a birefringence B of 0.07 and a change in birefringence with respect to temperature dB/dT of $9.09 \times 10^{-6}$/°C.

7. The sensor for use in the temperature system as recited in claim 6 wherein said fringe pattern is dependent on the thickness of said birefringent crystal, the wavelengths of said initial light spectrum, and the temperature of said birefringent crystal.

8. The sensor for use in the temperature system as recited in claim 7 wherein the X and Z axis of said birefringent crystal are oriented at an odd integer multiple angle of 45° to the optic axis of said first and second linear polarizing element and the optic axis of said first and second high temperature polarization maintaining waveguide to maximize the fringe pattern.

9. The sensor for use in the temperature system as recited in claim 8 wherein said multiple angle is 45° to maximize said fringe pattern.

10. A sensor for use in a temperature detector system to provide a detector array with a signal indicative of the current environmental temperature conditions experienced by the sensor, said sensor comprising:
   a linear polarizing element for orientating an initial broad band light spectrum communicated from a source carried on a first optic cable into a linearly polarized wave;

a high temperature optical waveguide consisting of a high refractive index core made of substituted aluminum garnet surrounded by a lower refractive index cladding made of yttrium aluminum garnet for directing said linearly polarized wave along a desired path while maintaining the polarization state of said linearly polarized wave;

a birefringent crystal located adjacent said high refractive index core of said first high temperature optical waveguide for receiving said linearly polarized wave from said first linear polarizing element, said linearly polarized wave decomposing into first and second orthogonally polarized waves, said first and second orthogonally polarized waves experiencing a phase difference on propagating through said birefringent crystal;

a reflective member for directing said first and second orthogonally polarized waves back through said birefringent crystal, forming third and fourth orthogonally polarized waves, said third and fourth orthogonally polarized waves experiencing a phase difference on propagating back through said birefringent crystal; said high temperature optical waveguide communicating said third and fourth orthogonally polarized waves to said linear polarizing element where said third and fourth orthogonally polarized waves are combined to create a modulated light spectrum having a fringe pattern, said fringe pattern being a function of the current temperature experienced by said birefringent element; and a splitter connected to said linear polarizer element for directing a portion of said modulated light spectrum having said fringe pattern through a fiber optic cable to an opto-electronic interface where said fringe pattern is extracted and a computer compatible signal is generated for a CPU to accurately indicate current environmental temperature conditions up to 1000° C. experienced by said birefringent crystal.

11. The sensor for use in the temperature system as recited in claim 10 where said birefringent crystal is lanthanum beryllate having a birefringence B of 0.07 and a change in birefringence with respect to temperature dB/dT of $9.09 \times 10^{-6}$/°C.

12. The sensor for use in the temperature system as recited in claim 11 wherein said fringe pattern is dependent on the thickness of said birefringent crystal, the wavelengths of said initial light spectrum, and the temperature of said birefringent crystal.

13. The sensor for use in the temperature system as recited in claim 12 wherein the X and Z axis of said birefringent crystal are oriented at an odd integer multiple angle of 45° to the optic axis of said first and second linear polarizing element and the optic axis of said first and second high temperature polarization maintaining waveguide to maximize the fringe pattern.

14. The sensor for use in the temperature system as recited in claim 13 wherein said multiple angle is 45° to maximize said fringe pattern.

* * * * *